Figure 1:
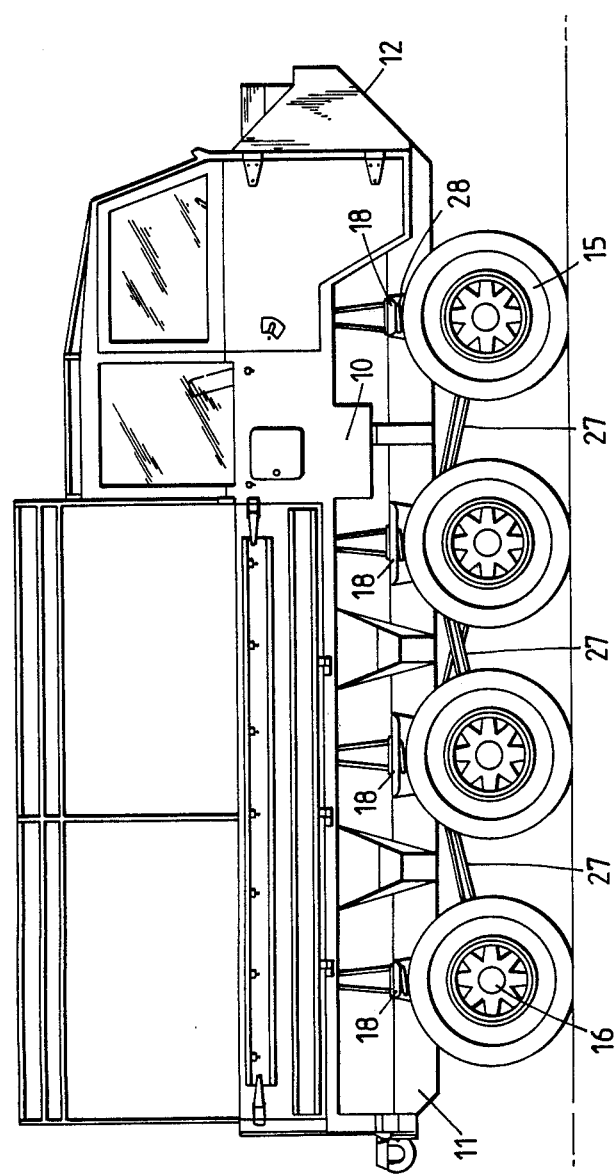

United States Patent [19]

Somerton-Rayner

[11] Patent Number: 4,966,244
[45] Date of Patent: Oct. 30, 1990

[54] VEHICLE HAVING PLURAL AXLES AND DRIVE SYSTEM THEREFOR

[75] Inventor: Michael Somerton-Rayner, Nr. Andover, Great Britain

[73] Assignee: Esarco Limited, Great Britain

[21] Appl. No.: 300,715

[22] Filed: Jan. 24, 1989

Related U.S. Application Data

[63] Continuation of Ser. No. 150,214, Jan. 29, 1988, abandoned.

[30] Foreign Application Priority Data

Jan. 30, 1987 [GB] United Kingdom ............... 8702084

[51] Int. Cl.⁵ .......................................... B60K 17/342
[52] U.S. Cl. .......................... 180/24.09; 180/24.08; 180/352; 280/91
[58] Field of Search .............. 180/24.01, 24.02, 24.08, 180/24.09, 24.11, 73.1, 22, 240, 246, 24.1, 352, 348, 363; 280/91, 689, 724; 188/349; 303/9.62; 464/68, 85, 117

[56] References Cited

U.S. PATENT DOCUMENTS

| 1,935,811 | 11/1938 | Metcalf | 464/117 |
|---|---|---|---|
| 2,204,989 | 6/1940 | Haltenberger | 180/73.1 |
| 2,804,158 | 8/1957 | Yunker | 280/91 |
| 3,504,948 | 4/1970 | Inada | 303/9.62 |
| 4,084,833 | 4/1978 | Mohrbacker et al. | 180/24.02 |
| 4,274,502 | 6/1981 | Somerton-Rayner | 180/24.08 |
| 4,329,899 | 5/1982 | Hori | 74/50 |
| 4,547,176 | 10/1985 | Loizeau | 464/68 |
| 4,678,041 | 7/1987 | Staudinger | 180/24.08 |
| 4,821,825 | 4/1989 | Somerton-Rayner | 180/24.09 |

FOREIGN PATENT DOCUMENTS

| 2613656 | 10/1977 | Fed. Rep. of Germany ... 180/24.09 |
|---|---|---|
| 693318 | 6/1953 | United Kingdom . |
| 874707 | 8/1961 | United Kingdom . |
| 899551 | 6/1962 | United Kingdom . |
| 1293928 | 10/1972 | United Kingdom . |
| 1314433 | 4/1973 | United Kingdom . |
| 1601157 | 10/1981 | United Kingdom . |
| 2172087A | 9/1986 | United Kingdom . |

Primary Examiner—Richard A. Bertsch
Assistant Examiner—Karin Tyson
Attorney, Agent, or Firm—Howard L. Rose

[57] ABSTRACT

An all-terrain vehicle is provided with eight wheels on four equidistant axles all driven from a single engine via two transfer boxes and differential gear units on each axle. The axles are fully floating beam axles on long travel coil springs and controlled by radius arms and Panhard rods. The radius arms may be parallel to and co-extensive with the respective propeller shafts coupling the differential gears to the transfer boxes and the connections between the propeller shafts and the transfer box outputs include torsional vibration dampers. The couplings at the ends of each propeller shaft to the transfer box and the differential gear unit comprise respective universal joints, and the yokes of the universal joints at opposite ends of the propeller shaft are set to be rotationally out of phase, with the driven yoke lagging the driving yoke. A dual circuit braking system with a deceleration sensing valve can be provided to limit the hydraulic pressure to the front wheel brakes.

12 Claims, 4 Drawing Sheets

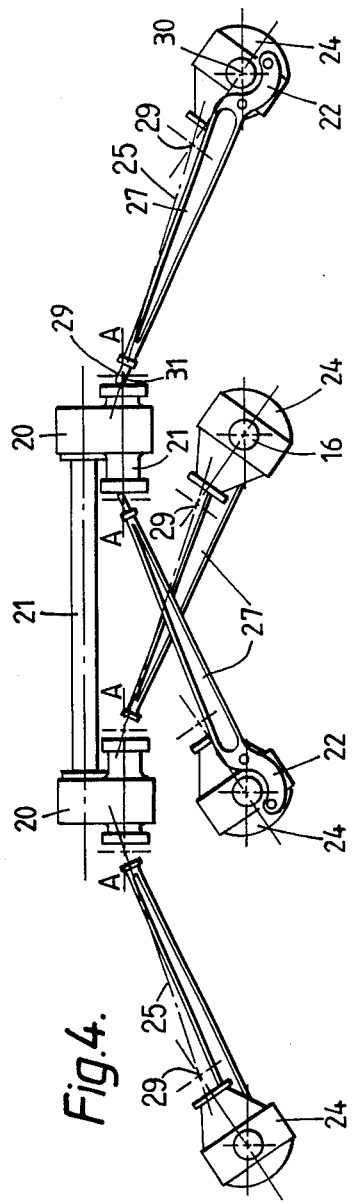
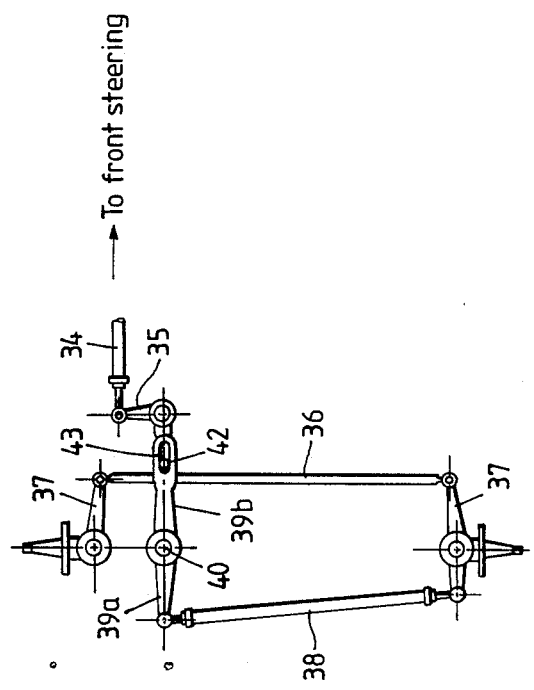
Fig.4.
Fig.6.

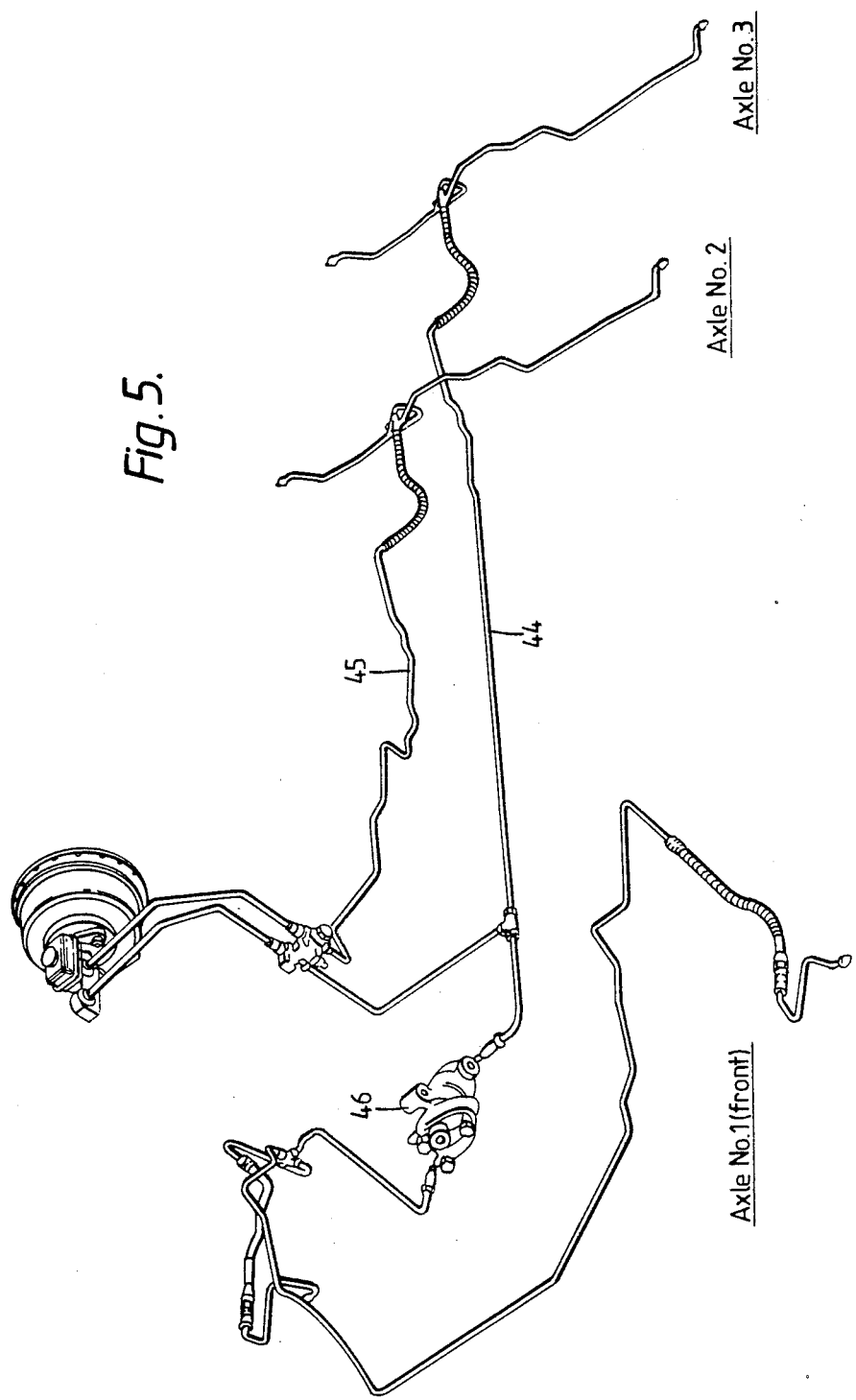

VEHICLE HAVING PLURAL AXLES AND DRIVE SYSTEM THEREFOR

This is a continuation of co-pending application Ser. No. 07/150,214, filed on Jan. 29, 1988 now abandoned.

This invention relates to all-terrain vehicles and its object is to provide an improved vehicle that will transport a substantial cargo over rough or soft terrain, can also be driven on roads by means of conventional automobile controls and, suitably adapted, can serve duty as an amphibious vehicle.

Such an all-terrain vehicle advantageously has a series of, e.g. four, roadwheel axles, equally spaced along its wheelbase, with all axles being powered by a single internal combustion engine through a first gearbox of the transfer box type, a second transfer box driven by an intermediate drive shaft, and a number of differential axle drive units, appropriate to the number of axles, each driven from one or other of the transfer boxes through a respective propeller shaft. In this arrangement, the transfer boxes allow selection of drive to the wheels on all the axles or only some of them. The axles can be mounted on swing axle radius rods and coil suspension springs that allow substantial vertical movement of the axles relatively to the vehicle body.

However, whereas the suspension system is designed to make possible large amounts of vertical movement between the wheels and the vehicle body, trials have shown that the propeller shafts of such vehicles, although universally-jointed to the gearbox outputs, are unable to cope satisfactorily with the consequential large angular movements between the gearbox outputs and the differential drives. It is therefore an object of the present invention to overcome this problem.

According to the invention, there is provided an all-terrain vehicle comprising a chassis with a load platform or body thereon, a series of longitudinally-spaced axles with pairs of ground wheels thereon, suspension means enabling each axle to perform substantial vertical movement relatively to the chassis, a respective differential gear axle drive unit for each axle, and two gearboxes of the transfer box type driven by a single engine, each differential drive unit being driven from one or other of the transfer boxes through a respective inclined propeller shaft coupled at its ends to the transfer box and the differential gear unit by respective universal joints, and wherein the yokes of the universal joints at opposite ends of each propeller shaft are set to be rotationally out of phase, with the driven yoke lagging the driving yoke.

In the preferred form, the coupling between each propeller shaft and the respective transfer box includes a torsional vibration damper Preferably also, each torsional vibration damper comprises a spring-loaded clutch with radial rubber dampers.

This has been found to substantially eliminate the loss in constant velocity to the propeller shafts, extending their service life to 40,000 miles.

Another important benefit is achieved by making the radius rods each parallel to and substantially coextensive with the respective propeller shaft. That is to say, the lower pivot of the radius rod is substantially coaxial with the axle and the upper pivot of the radius rod is substantially coaxial with the centre of the universal joint coupling the propeller shaft to the respective transfer box output. This ensures that the two differential angles are brought to equality and this equality is maintained throughout the vertical movement of the axle.

Figure 2:
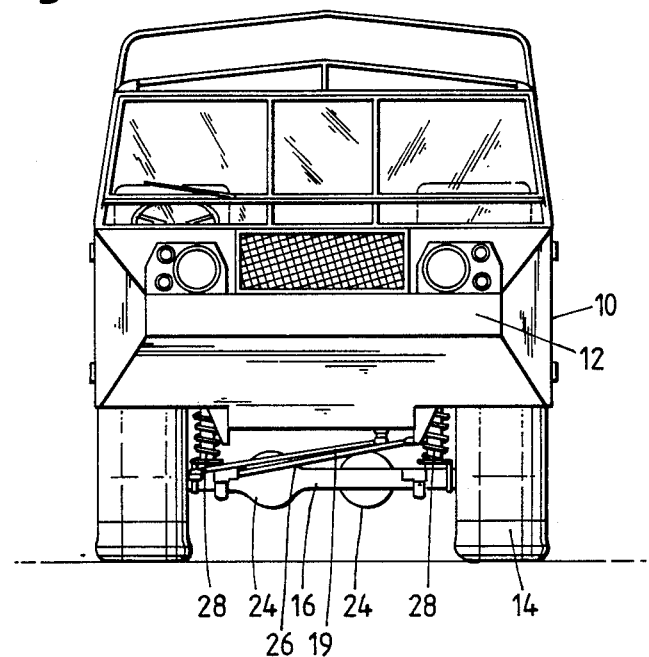
Figure 3:
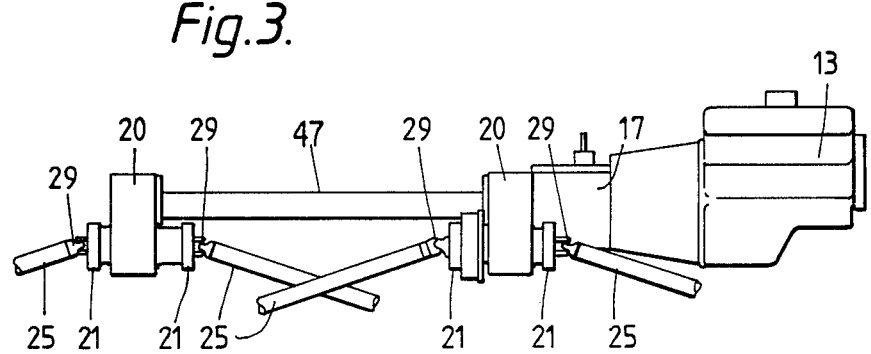

One embodiment of the invention will now be described by way of example, with reference to the accompanying drawings, in which:

FIGS. 1 and 2 are, respectively, side and front elevations of a vehicle embodying the invention, FIG. 3 is a diagrammatic side elevation of the engine and drive transmission, FIG. 4 is a diagrammatic side elevation showing the relationship of the propeller shafts and the suspension radius rods, FIG. 5 is a diagram of the braking system, and FIG. 6 is a diagrammatic plan of the steering system.

The vehicle has a main frame comprising two longitudinally-extending fabricated hollow box sections 11 joined by front and rear cross members that allow a degree of torsional flexibility. Support hangers 18 for the hull or body 10 are welded directly to this main frame to form a unitary welded structure. The front of the hull structure at 12 is strengthened to allow the vehicle to be driven through a hedge of average European density.

To the bottom of the box members 11 are welded lugs for swing axle radius rods 27 which provide independent vertical movement of the axles 16 on coil springs 28, with a degree of lateral movement permitted by Panhard rods 26. The aim is to permit the use of comparatively short propeller shafts for driving the wheels and maintain the shaft universal joints within their permitted angle of operation, while providing sufficient vertical movement to the axle. The swing axles have 9 inches of vertical movement.

Referring now to FIG. 3, the vehicle is powered by a water-cooled V8 petrol engine 13 mounted at the forward end of the chassis, after which the drive is taken from a gearbox 17 through two transfer boxes 20 arranged at either end of a combined support and intermediate drive shaft 47. The drive to the four axles is transmitted from the transfer boxes to four differential drive units 24 on the axles 16 by two pairs of inclined propeller shafts 25 coupled to the outputs of the transfer boxes by universal joints 29 each constituted by an assembly of interconnected yokes. The axles 16 are of the beam type with spiral bevel differential gear units 24 and fully floating shafts.

The vehicle has eight wheels 15 with strengthened hubs on the four axles 16, fitted with extra large balloon tyres 14 to give an extremely low ground pressure, and the driving arrangements allow four- or eight-wheel drive to be selected. One of the transfer boxes 20 drives the first and third axles while the other drives the second and fourth axles, thereby allowing all four axles, or only the centre two, to be driven. The gaps between the wheel tyres are 4 to 8 inches, giving a ramp brake overangle of 90°. The ground pressure when fully loaded is not more than 7.8 pounds per square inch.

Referring again to FIG. 3, the universal joints 29 are connected to the outputs of the transfer boxes 20 by torsional vibration dampers 21. For this purpose, a spring-loaded clutch with radial rubber dampers can be employed. This enables the propeller shaft assemblies to accommodate the considerable angular movements between the transfer box outputs and the differential drive units.

Referring to FIG. 4, this shows the relationship of the inclined radius rods 27 of the suspension and the propeller shafts 25. It also depicts schematically the lower universal joints 29, which are the same as the upper joints 29, connecting the lower ends of the propeller shafts 25 to the differential gear units 24. It will be seen that the pivotal axes 30 at the lower ends 22 of the radius rods 27 are substantially coaxial with the axles 16 and the pivotal axes 31 at the upper ends of the radius rods are substantially coaxial with the centres of the propeller shaft universal joints 29, making the radius rods 27 and the propeller shafts 25 parallel and substantially co-extensive. This maintains equality of the differential unit angles in each case throughout the vertical movement of the axle. The total angular change of each propeller shaft is 27°. The yokes of universal joints 29, located at opposite ends of propeller shafts 25, are configured to be rotationally out of phase with the driven yoke lagging the driving yoke preferably by approximately 11°.

Both the front and rear axles have conventional knuckle joints for steering The steering is arranged so that the front axle is steered and the rear axle has a controlled castoring action, together producing a turning circle of 9 feet inner radius. The effective wheelbase of the arrangement is 35 inches, giving this small turning circle. Referring to FIG. 6, the front wheels are steered by conventional power steering and the steering transmission from the front steering box to the rear wheels is through a longitudinally-extending link rod 34 connecting a fixed length relay arm at the front to a bell crank lever 35 at the rear. The arrangement is designed to give a reduced amount of turning angle and a lower rate of angular movement of the rear wheels, in order to avoid any over-steer 'feel' from the castoring rear axle.

The rear wheels are coupled for steering by a link 36 and arms 37, and one wheel is coupled to a drag link 38 pivotally connected to an arm 39a that turns in unison with a further arm 39b about a pivotal mounting 40 on the chassis. The arm 39b is in turn connected to the bell crank 35 by a reverse angle crosshead 41 comprising a pin 42 on the bell crank operating in an axial slot 43 in the arm 39b. This causes the castoring rear axle to introduce an assisting force into the front axle steering, which reduces the loading in the linkage between the steering wheel and the front axle.

The longitudinally-extending link rod 34 incorporates a disconnectable coupling (not shown) which allows both disconnection of the front and rear steering systems and adjustment of the length of the link rod.

The vehicle is designed to carry a load of 2.0 tonnes over rough terrain and extremely soft ground but additionally can be used on the road. It is fitted with full equipment to comply with this latter requirement and has conventional driving controls needing no special driver training. It can wade to a depth of at least 18 inches, climb gradients up to 45° and has a 40° maximum angle of tilt.

FIG. 5 shows the braking system, which is a double circuit hydraulic system, operating on the front and third axles through one circuit 44 and the second axle only through the second circuit 45. Additionally, a deceleration sensing valve 46 with two different diameters is provided to limit the hydraulic pressure in the front wheel brakes, which is variable by the amount of 'G' force applied during the deceleration of the vehicle. This ensures that the front wheels cannot lock before the wheels of the second axle.

I claim:

1. An all-terrain vehicle comprising a chassis with a load platform or body and a single engine mounted thereon, a series of longitudinally-spaced axles with pairs of ground wheels thereon, suspension means coupling said axles to said chassis and enabling each axle to perform substantial vertical movement relative to the chassis, a respective differential gear axle drive unit for each axle, two transfer boxes both driven by said single engine, each transfer box having two driving outputs, and inclined propeller shafts provided one for each axle whereby each differential axle drive unit is connected to be driven by a respective one of said transfer box driving outputs, each propeller shaft having first coupling means coupling a first end of said shaft to the respective transfer box driving output and second coupling means coupling a second end of said shaft to the respective differential axle drive unit, each said first and second coupling means including a respective universal joint constituted by an assembly of interconnected yokes, wherein said yoke assembly of said first coupling means is set to be rotationally out of phase with the yoke assembly of said second coupling means, lagging the yoke assembly of said first coupling means by approximately 11° of rotation.

2. A vehicle according to claim 1, wherein the coupling between each propeller shaft and the respective transfer box includes a torsional vibration damper.

3. A vehicle according to claim 1 or claim 2 wherein the axles are of the beam type with fully floating axle shafts, and the suspension also comprises coil suspension springs coupled between the chassis and the axles, with radius arms and Panhard rods operatively coupled between the chassis and the axles to control the axle movements.

4. A vehicle according to claim 1, further comprising inclined radius rods for each axle, each said rod having an upper end connected by an upper pivot to the chassis and a lower end connected by a lower pivot to the respective axle, and each radius rod having the same direction of slope as the propeller shaft for the respective axle, with the lower pivot of each radius rod substantially coaxial with the respective axle.

5. A vehicle according to claim 4, wherein each radius rod is substantially parallel to and substantially co-extensive with the respective propeller shaft, the upper pivot of the radius rod being substantially coaxial with the centre of the universal joint coupling the propeller shaft to the transfer box.

6. A vehicle according to claim 1 or claim 2 having a braking system said braking system being a double circuit hydraulic system, operating on one group of axles through one circuit and another axle or group of axles through the second circuit.

7. A vehicle according to claim 6, wherein the braking system incorporates a deceleration sensing valve arranged to limit the hydraulic pressure in the front wheel brakes.

8. A four-axle vehicle according to claim 1 or claim 2 wherein the wheels on the most forward axle are steered, and the wheels on the rearmost axle perform controlled steering.

9. A vehicle according to claim 8, wherein the front and rear steerable wheels are coupled in such manner that the rear wheels castor to a smaller turning angle at a lower rate of angular movement than the front wheels.

10. A four-axle vehicle according to claim 1 or claim 2 further comprising means, including said transfer boxes, for applying driving force to a number of axles sin the range from one pair to two pairs wherein centrally located axles are driven at all times.

11. An all-terrain vehicle comprising:
a chassis and a single engine mounted thereon,
a plurality of longitudinally-spaced axles with ground wheels thereon wherein the axles are of the beam type with fully floating axle shafts,
suspension means coupling said axles to said chassis and enabling each axle to perform substantial vertical movement relative to the chassis where the suspension means comprises coil suspension springs coupled between the chassis and the axles, with radius arms and Panhard rods operatively coupled between the chassis and the axles to control the axle movements,
a respective differential gear axle drive unit for each axle, and
two transfer boxes both driven by said single engine, at least one of said transfer boxes driving at least two different drive units through a respective inclined propeller shaft coupled at its ends to the transfer box and the differential gear unit by respective universal joints, and wherein the yokes of the universal joints at opposite ends of each propeller shaft are set to be rotationally out of phase, with the driven yoke lagging the driving yoke and where the radius rods have the same direction of slope as the propeller shaft for the respective axle, with the lower pivot of each radius rod substantially coaxial with the respective axle.

12. A vehicle according to claim 11 wherein each radius rod is substantially parallel to and substantially coextensive with the respective propeller shaft, the upper pivot of the radius rod being substantially coaxial with the center of the universal joint coupling the propeller shaft to the transfer box.

* * * * *